United States Patent [19]

Gartner et al.

[11] Patent Number: 5,359,195

[45] Date of Patent: * Oct. 25, 1994

[54] GAS HOLD UP TOOL FOR USE IN CASED WELL BOREHOLES

[75] Inventors: Michael L. Gartner, Austin; Paul L. Sinclair, Clear Lake Shore; Christopher A. Schnoor, Austin, all of Tex.

[73] Assignee: Halliburton Logging Services, Inc., Houston, Tex.

[*] Notice: The portion of the term of this patent subsequent to Apr. 27, 2010 has been disclaimed.

[21] Appl. No.: 841,949

[22] Filed: Feb. 26, 1992

[51] Int. Cl.$^5$ .............................................. G01V 5/12
[52] U.S. Cl. ................................................. 250/269.1
[58] Field of Search ......................... 250/269, 262, 258; 378/51, 86, 89

[56] References Cited

U.S. PATENT DOCUMENTS

| | | | |
|---|---|---|---|
| 2,961,539 | 11/1960 | Egan et al. | |
| 3,909,603 | 9/1975 | Nicolas | 235/151.34 |
| 4,047,027 | 9/1977 | Bateman et al. | 250/264 |
| 4,441,361 | 4/1984 | Carlson et al. | 73/155 |
| 4,490,609 | 12/1984 | Chevalier | 250/269 |
| 4,492,865 | 1/1985 | Murphy et al. | 250/265 |
| 4,558,220 | 12/1985 | Evans | 250/269 |
| 4,574,193 | 3/1986 | Arnold et al. | 250/270 |
| 4,737,636 | 4/1988 | Smith, Jr. | 250/269 |
| 4,864,129 | 9/1989 | Paske et al. | 250/269 |
| 4,924,099 | 5/1990 | Lim et al. | 250/390.04 |
| 4,939,362 | 7/1990 | Supernaw et al. | 250/269 |
| 5,012,091 | 4/1991 | Moake | 250/262 |
| 5,205,167 | 4/1993 | Gartner et al. | 250/267 |

FOREIGN PATENT DOCUMENTS 2227841A 8/0890 United Kingdom.

OTHER PUBLICATIONS

Evans, "Three Phase Borehole Fluid Identification System", The Log Analyst, Mar.-Apr. 1979, p. 41.

*Primary Examiner*—Carolyn E. Fields
*Attorney, Agent, or Firm*—Arnold, White & Durkee

[57] ABSTRACT

A method and apparatus for determining the percentage of gas by volume in a well producing mixed phase fluids and flowing up the cased well. A low energy gamma ray source irradiates the flowing fluid and counts are measured by a detector crystal. A metal casing shields the surrounding formations from the gamma radiation so that the detector response is determined primarily by the mixed phase fluids flowing in the well. Calibration enables the determination of gas volume percentage for a specific diameter casing.

21 Claims, 3 Drawing Sheets

GAS HOLD UP TOOL FOR USE IN CASED WELL BOREHOLES

BACKGROUND OF THE DISCLOSURE

This invention deals with the measurement of gas cut or gas holdup in multiphase fluid flow in a cased well borehole. More particularly, this instrument deals with an apparatus for measuring the volume of gas present in a multiphase flow regime in a cased oil or gas well borehole.

The problem long existing in the area of production logging of cased well boreholes has been to separate the phases of flow, namely solid, liquid or gaseous, and measure each component of the multiphase flow. Addition of the phases of solid, liquid, and gas in a multiphase flow provides the totals. The liquid phase may also contain slugs of oil or water interspersed with the solid particles and the gaseous phase may be in the form of small bubbles or large bubbles. So called stratified flow may occur at locations where the well casing may be horizontal or nearly horizontal or where the gas phase has separated by gravity from the liquid and solid phase and formed a stratified gaseous layer.

Of course, the measurement of the liquid phase, solid phase, and gaseous phase of the well fluid may be divided into separate measurements of each of the phases. The present invention concerns instruments and techniques for measuring the gaseous phase of fluid flow in a cased well borehole in which the gaseous phase is separated out, i.e., not in solution, from the liquid phase in the form of small or large gas bubbles or stratified fluid flow. The techniques and apparatus of the present invention are not believed to be applicable in the situation where the gas produced by the well is in solution with the liquid phase. However, as will be discussed in more detail subsequently, the present apparatus and techniques do encompass methods for the measurement of gas holdup or percentage volume gas flow in either bubble form or stratified form of flow in the cased well borehole.

BRIEF DESCRIPTION OF THE INVENTION

The apparatus and techniques of the present invention comprise the use of a low energy gamma ray source and a sodium iodide detector located a very short distance from the source and separated from it by shielding material. Low energy gamma rays are emitted from the source and scattered back from the production fluid to a detector comprising a sodium iodide crystal and photomultiplier tube. The count rate is inversely proportional to the gas volume fraction or gas holdup in the cased borehole. The use of the relatively low energy gamma rays renders the instrument and technique insensitive to changes in formation character outside the well casing. The casing effectively acts as a screen or shield for the low energy gamma rays, i.e., the gamma rays will penetrate the casing once at the most but will not reenter the casing after first passing through it. Thus, a measurement is provided of gas holdup or gas volume percentage of the flow which is relatively insensitive to material composition outside the casing. The apparatus is relatively insensitive to the casing thickness but not to the casing diameter, for which compensation is provided.

The use of relatively low energy gamma rays and a carefully chosen source-detection spacing renders the instrument and technique relatively insensitive to the composition of the liquid in the borehole, i.e, oil, salt water, fresh water. Two gamma ray interaction processes are predominant in the energy range below 100 keV. These are scattering, proportional to the density of the scattering medium, and photoelectric absorption, proportional to a function of the atomic number (Z) of the medium. For the liquids commonly present in a production fluid, i.e. oil, salt water, fresh water, the effects of scattering and absorption apparently cancel with one another, producing no net change in count rate if, for a given volume, the liquid phase is changed from oil to fresh water or salt water. This fortuitous circumstance occurs because a change from oil to fresh water or salt water is accompanied by an increase in density and an increase in the atomic number Z. An increase in density causes an increase in scattering back to the detector resulting in an increase in the count rate: an increase in Z results in an increase in photoelectric absorption causing a decrease in count rate. The increase in count rate due to an increase in density very nearly equals the decrease in count rate due to the increase in Z, resulting in minimal net change in count rate and thus providing a measurement of gas volume or gas holdup that is relatively insensitive to the composition of the liquid in the borehole.

The apparatus and techniques of this invention are relatively insensitive to gas volume distribution. For a given gas volume distribution the same count rate is recorded regardless of how the gas is distributed within the fluid.

This instrument and the techniques are thus suitable for use in highly deviated wells where the gas may be separated from the liquid phase in a stratified flow regime, or can be used equally well in vertical wells where the gas may be uniformly mixed as bubbles with the well fluid liquids but not dissolved therein.

The present invention may be best understood by the following detailed description thereof when taken in conjunction with the accompanying drawings in which:

DESCRIPTION OF THE PREFERRED EMBODIMENT

Well logging surveys are often made in producing oil and gas wells to determine the volumetric concentration of each component. These data along with measurements of the fluid flow velocity may be used to determine production rates from each zone of interest in the well. Thus, intervals producing oil, gas, water, or some combination of the three may be identified in the producing well. Such data are essential for improving oil and gas production, reducing water production, and managing the field reservoir.

The apparatus and techniques of the present invention disclose methods and techniques of measuring the volume fraction of gas (gas holdup) in the production fluid. The gas holdup is distinguished from the gas cut which is the total volume of gas versus liquid produced at the surface. The gas/liquid ratio varies as a function of pressure in the well borehole. Since the gas is relatively compressible, the gas holdup at deeper depths in a well borehole usually amounts to less volume percentage of the fluid flow at such greater depths than the gas cut which is produced at the surface.

Figure 1:
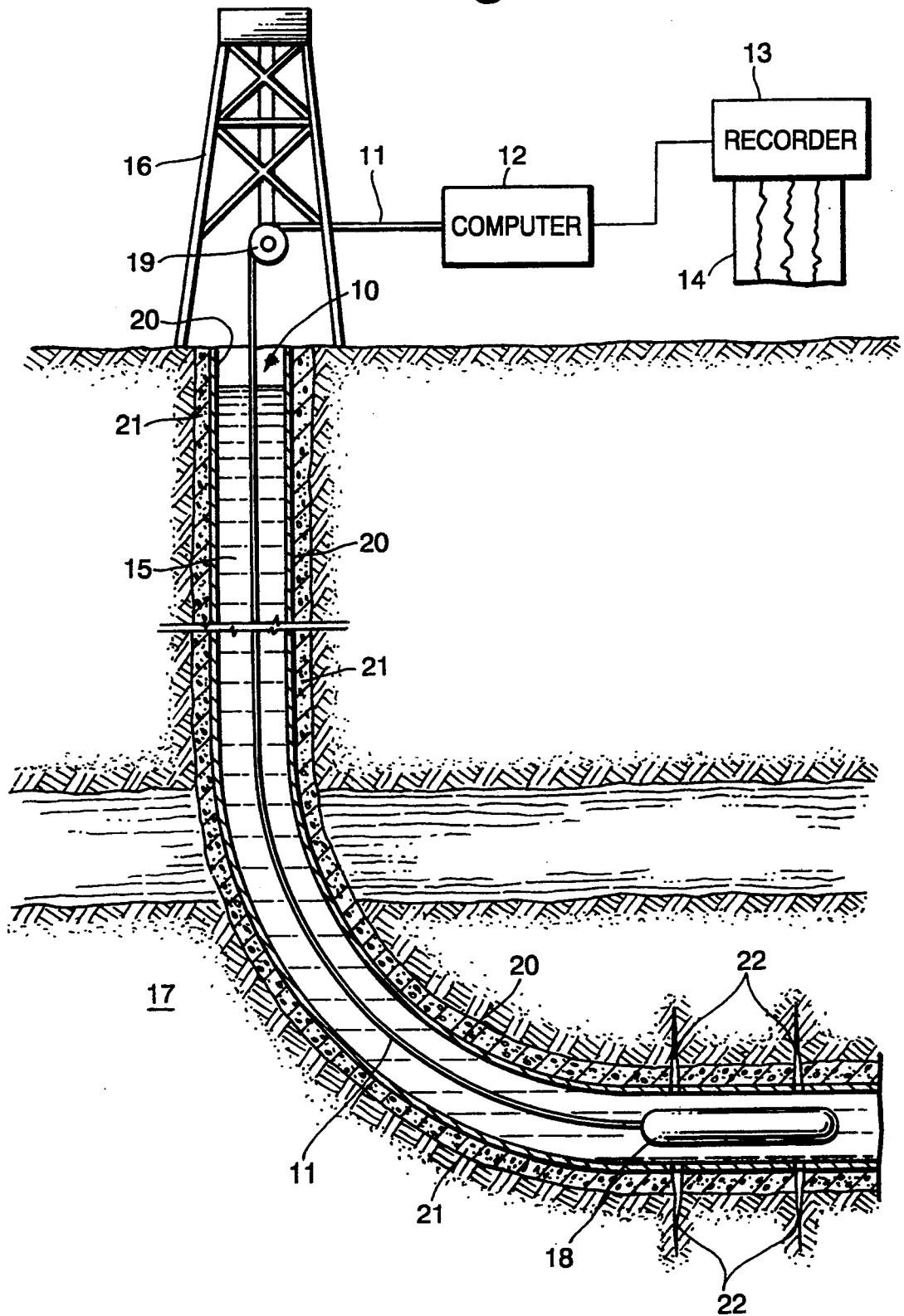
FIG. 1 is a schematic view illustrating an instrument according to concepts of the present invention deployed in a highly deviated well borehole.

Referring initially to FIG. 1, a well logging sonde is deployed in a cased well borehole 10 via a well logging cable 11 of the conventional armored multiconductor type known in the art. The well is a highly deviated well. A rig structure 16 at the surface supports a sheave 19 over which the logging cable 11 passes in a conventional manner. Reel equipment (not shown) is located at the surface to raise and lower this well logging sonde 18 in the cased borehole 10. The borehole 10 is cased with a steel casing 20 surrounded by a cement sheath 21 to hold the casing 20 in place and to prevent fluid communication between the numerous multiple horizontal layers of formations 17 penetrated by the well borehole 10. The cement sheath 21 and the casing 20 are penetrated by several perforations 22 into a producing zone so that produced liquids and gas enter the well borehole from the production perforations. The produced fluids may contain a gas holdup which is indicated by the bubbles in the well fluid 15 shown in FIG. 1. It is the purpose of the tool 18 of FIG. 1 to measure the gas holdup according to principles of the present invention and to send signals via the logging cable 11 to a surface computer 12 which determines the gas holdup as a function of depth and supplies the recorder 13 with this information which is output on a record medium 14.

Figure 2:
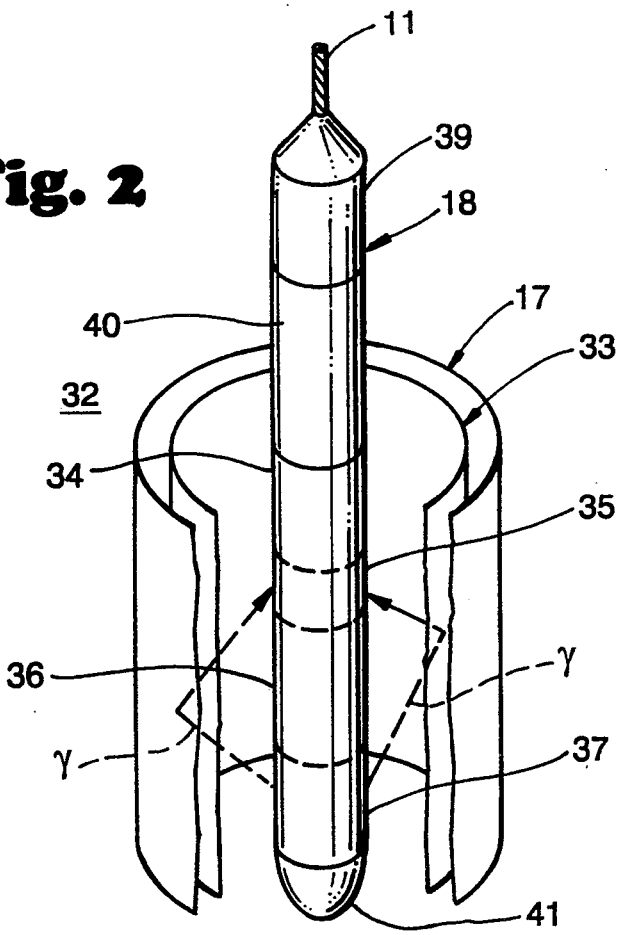
FIG. 2 is a schematic illustration showing the well logging instrument according to the concepts of the present invention deployed in a cased borehole.

Referring now to FIG. 2, a gas holdup tool 18, according to concepts of the present invention, is illustrated schematically but in more detail than shown in FIG. 1. A well logging cable 11 is connected in a conventional manner to the upper end of the logging tool 18. A bull plug 41 protects the lower end of the tool and prevents it from being damaged while being run in or out of the well borehole 20. A radioactive source 37 of relatively low energy gamma rays is disposed immediately adjacent the bull plug 41 at the lower end of the logging tool 18. This source may consist of a radioactive isotopic cobalt 57 source having a photo peak energy of 122 keV, a radioactive isotopic cadmium 109 source. having a photo peak energy of 88 keV, or other similar low-energy source of gamma rays. Thus a radioactive source 37 of cobalt 37 will primarily supply 122 keV gamma rays which will impinge upon the fluid inside the casing 33 and which rays are indicated by the dotted lines labeled with the Greek letter $\gamma$ in FIG. 2. The source 37 is separated by a lead shield 36 from a detector crystal 35 which is situated in close spacing to the gamma ray source 37. The detector crystal 35 is separated by the lead shielding material 36 which is sufficiently thick to prevent direct irradiation of the detector crystal 35 by the gamma rays from the radioactive source 37.

The scattered gamma rays from the irradiated fluid inside the casing are scattered back toward the detector crystal 35 which typically may comprise a one inch diameter by two inch long sodium iodide crystal which is optically coupled to a one inch diameter photomultiplier tube (PMT) 34. It will be noted that the relatively low energy gamma rays will not penetrate two thicknesses of the surrounding well casing 33. Thus, gamma rays which leave the cased hole are not likely to be scattered back into detector crystal 35 by the earth formations 17 surrounding the well casing 33. The outside housing of the instrument 18 of FIG. 2 comprises a 1 11/16 inch diameter thin wall steel tubing but may also include other metals such as aluminum.

Light flashes produced in the detector crystal 35 are detected by photomultiplier tube 34, converted to electrical pulses, and amplified and supplied to an electronic section 40 of the down hole instrument 18. The pulses produced by the PMT 34 are counted and stored in a memory bank in the electronic section 40 of the instrument. The pulses are transferred out of the memory bank at a regular rate by means of a telemetry system 39 located at the upper end of the sonde. Signals from the telemetry component are supplied by a conductor or several conductors within a conventional multiconductor well logging cable 11 armored on the outside in a manner known in the art.

Figure 3:
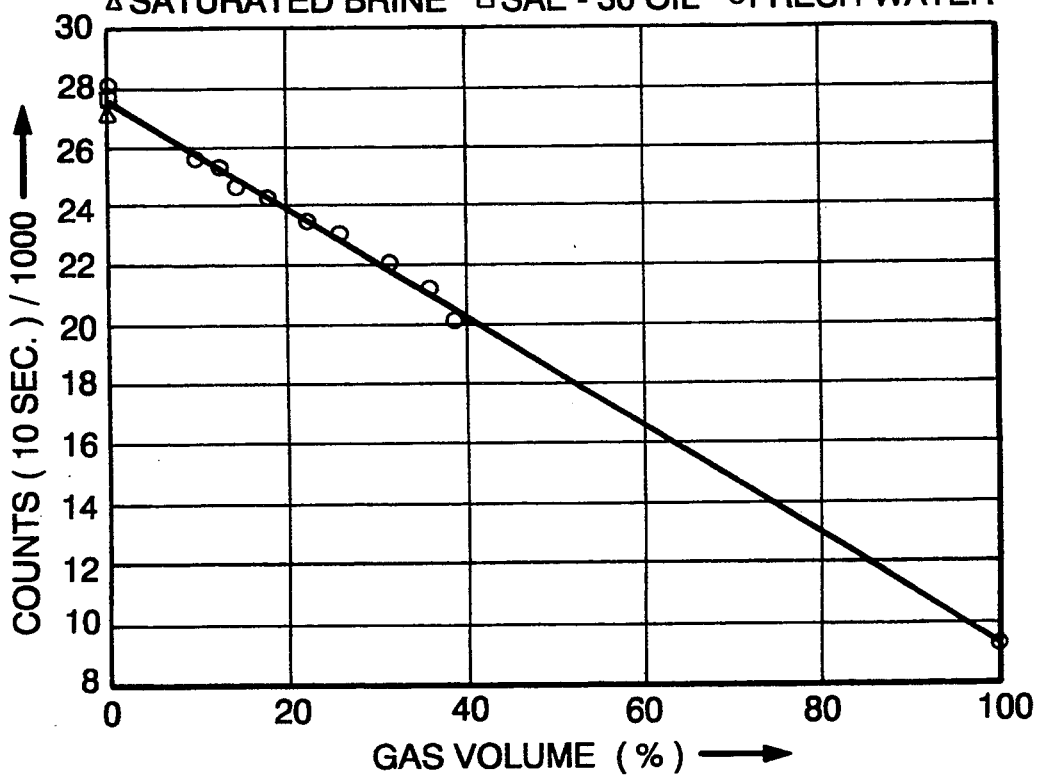
FIG. 3 is a graphical representation illustrating the response of a tool according to concepts of the present invention for different gas hold ups or gas volume distributions and with different liquids.
Figure 4:
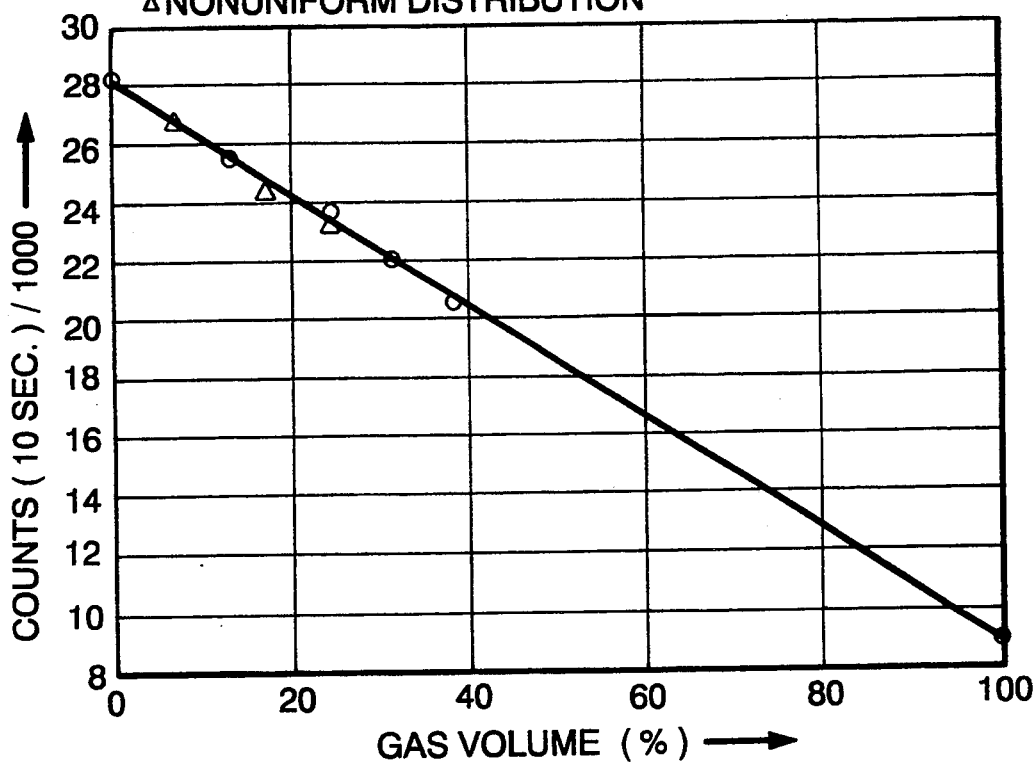
FIG. 4 is a graphical representation illustrating the response of the instrument according to the concepts of the present invention with uniform and nonuniform (stratified) gas distributions surrounding the instrument.
Figure 5:
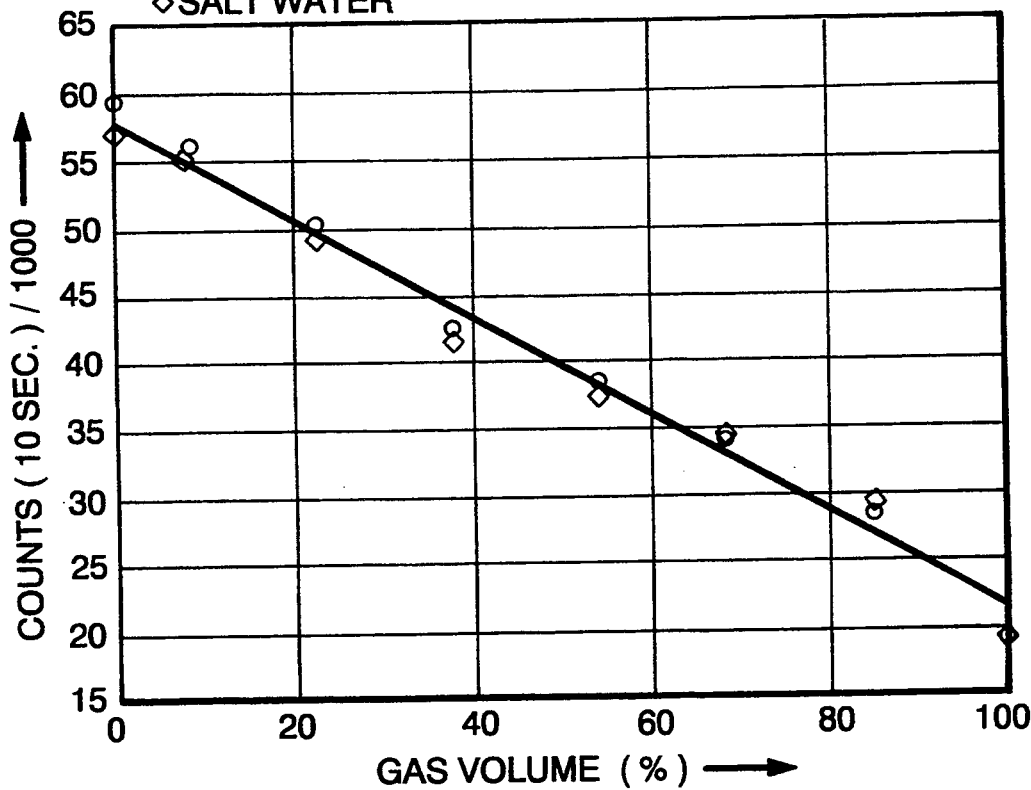
FIG. 5 is a graphical representation illustrating the relative insensitivity of the instrumentation and methods of the present invention to water salinity.

Signals from the telemetry circuit 39 in the downhole tool 18 are detected at the surface and supplied to the surface computer 12 which is programmed to implement the predetermined relationships shown in FIGS. 3, 4, and 5 which are graphical relationships illustrating the count rate at the detector in the downhole tool as a function of gas volume or gas holdup being produced from the earth formations in the vicinity of the well borehole 10 of FIG. 1.

As discussed previously, the radioactive isotopes of cobalt 57 or cadmium 109 have been found in practice to provide relatively low energy gamma rays such that they will not penetrate the surrounding well casing 33.

As shown in FIG. 3, the count rate is inversely proportional to the gas holdup present in the fluid flow at the location of the detector. In FIG. 4 this relationship is illustrated for a gas volume distribution of both nonuniform and uniform distribution in the vicinity of the detector. In the uniform gas distribution, the gas is present in the form of bubbles approximately uniformly distributed in the liquid phase of the flow and is symmetrically located about the instrument in the wellbore. In the nonuniform distribution illustrated in FIG. 4, stratified flow or actual separation of the fluid phases by layering illustrates that the response of the instrument 18 remains approximately the same in this flow or production condition. Thus, the instrument made according to the concepts of the present invention is suitable for use in highly deviated wellbores such as that illustrated in FIG. 1 in which horizontal layering of the fluids may occur at depths where the wellbore runs essentially in a horizontal direction.

In FIG. 5 a graphical representation illustrating the count rate at the detector as a function of the gas holdup for both fresh water and salt water fluids in the fluid filled borehole is illustrated. This graph shows that the response remains approximately linear whether the produced fluid is fresh water or salt water. Similar responses from oil, light oil and heavy oil (not shown) illustrate that the instrument response is maintained in a linear fashion in all cases in which the gas is not in a dissolved state in the fluid produced by the well. Laboratory calibration measurements produced with known standards on apparatus have determined the graphical relationships in FIGS. 3, 4, and 5. Similar laboratory measurements have shown that the system is not sensitive to casing thickness in any great measure and that while the measurement is sensitive to the diameter of the well casing, calibration relationships for a casing of a particular diameter enables a system to be sized and scaled before hand in the memory of the surface computer 12 so that diameter change can be easily corrected.

Experiments with apparatus such as that illustrated in FIG. 2 have indicated that the measurement of the gas holdup made with such an instrument can be a precise measurement and is relatively insensitive to the composition of the liquid phase whether oil, salt water, or fresh water, and is insensitive to material changes outside the casing due to the shielding effect of the casing. The tool measurements can be insensitive to casing thickness (but not casing diameter) and to the volume distribution of the gas holdup in the well fluid. This last attribute implies that this measurement is suitable for use in highly deviated wells where the gas may be separated from the liquid phase as well as in vertical wells where the gas may be uniformly mixed as bubbles with the liquids.

The record produced by the recorder 13 of FIG. 1 is a curve of gas holdup as a function of depth in the well borehole of the downhole sonde 18. This information can be interpreted dependent on entry points of gas or separation of gas and liquid phases at changing pressure conditions at different depth levels in the well borehole and provides a very valuable cross section of the well production for analysis by the geophysicist.

While the foregoing description may suggest other or alternative embodiments of the invention to those skilled in the art, it is the aim of the appended claims to encompass such changes and modifications within the true spirit and scope of the invention.

What is claimed is:

1. A system for determining the percentage of gas by volume in mixed phase well fluids produced in a cased well borehole and flowing upwardly through a metal casing comprising:
   (a) a source of relatively low energy gamma rays, the energy of said gamma rays being chosen such that there is a small probability that a gamma ray from said source could penetrate the metal casing and be scattered back through the metal casing by material outside the casing;
   (b) a scintillation detector of gamma radiation and cooperative shielding for preventing direct irradiation of said detector by said source while allowing the placement of said detector in close proximity to said source to allow detection of gamma rays emitted by said source and scattered by materials inside said metal casing;
   (c) means for counting gamma rays detected by said detector and storing count rate signals thereof; and
   (d) means for processing said count rate signals according to a predetermined relationship to derive a measurement of the percentage of gas by volume in the well fluid in the vicinity of said source.

2. The apparatus of claim 1 further including a housing means for housing said source and said detector internally of said metal casing in which said produced well fluid is flowing.

3. The apparatus of claim 2 wherein said housing means internally supports said source, said detector, and said gamma ray counting means and said housing means is moveable through the cased well borehole supported on a wireline cable.

4. The apparatus of claim 3 wherein said shielding comprises at least approximately one half inch thickness of lead having the same cross sectional shape and area as said scintillation detector and said shielding is placed immediately adjacent to said scintillation detector at one end of a cylindrically shaped sodium iodide crystal comprising a portion of said detector and said crystal has a second end having a photomultiplier tube optically coupled thereto to form pulse count signals.

5. The apparatus of claim 3 further including a telemetry system in said housing means for transmitting said count rate signals on said wireline cable as telemetry signals from said housing means to the earth's surface.

6. The apparatus of claim 5 further including computer means for processing said telemetry signals received at the surface of the earth according to a predetermined relationship as a function of well casing diameter to derive the measurement of the percentage of gas by volume, and including means for determining said measurement as a function of borehole depth.

7. The system of claim 6 wherein said predetermined relationship which is a function of well casing diameter comprises one of a plurality of calibrated relationships from plural and various diameter well casing stored in the memory of said computer means.

8. The apparatus of claim 1 wherein said source is cobalt 57 or cadmium 109, and said source and said detector are housed in a closed housing member positioned inside the well casing in which said produced well fluids are flowing to the earth's surface.

9. The apparatus of claim 8 wherein said detector comprises an approximately cylindrical sodium iodide crystal optically coupled to a photomultiplier tube.

10. A method of measuring the percentage of gas by volume in mixed phase well fluids, comprising the steps of:
   (a) positioning a source of low energy gamma rays in a cased well having flowing fluids wherein the energy level is selected so that the gamma ray irradiation from the source is not likely to penetrate the casing of the well and be scattered back into the casing from formation materials outside the casing;
   (b) detecting the gamma rays scattered by materials in the casing in near proximity to the source; and
   (c) converting the detected gamma ray counts by predetermined relationships into a measurement of the percentage of gas by volume in the well fluids flowing in the cased well.

11. The method of claim 10 including the step of determining different predetermined relationships for different diameters of well casing.

12. The method of claim 11 including the step of shielding a detector from direct irradiation by the source.

13. The method of claim 12 including the step of raising the gamma ray source along the cased well, and detecting gamma ray counts along the cased well.

14. The method of claim 13 including the step of positioning the source and the shielded detector in a closed housing, and pulling the housing along the well.

15. The method of claim 14 including the step of pulling the housing along a deviated well exposed to stratified and separated flow permitting gas to rise to one side of the cased well.

16. The method of claim 10 including the step of moving the gamma ray source along the cased well while recording source depth in the well and determining the measurement of the percentage of gas by volume as a function of said depth.

17. The method of claim 16 including the initial step of positioning the source at the bottom of the cased well.

18. The method of claim 17 including the step of pulling the gamma ray source in a housing along the well by an armored logging cable.

19. A system for determining the percentage of gas by volume in mixed phase well fluids produced in a cased well borehole and flowing upwardly through a metal casing comprising:
   a source of relatively low energy gamma rays, the energy of said gamma rays being chosen such that there is a small probability that a gamma ray from said source could penetrate the metal casing and be scattered back through the metal casing by material outside the casing;
   a scintillation detector of gamma radiation and cooperative shielding for preventing direct irradiation of said detector by said source while allowing the placement of said detector in close proximity to said source to allow detection of gamma rays emitted by said source and scattered by materials inside said metal casing, said scintillation detector comprising a generally cylindrically shaped sodium iodide crystal and a photomultiplier tube optically coupled to a first end of said crystal and thereof to form pulse count signals, and wherein said shielding comprises an at least approximately one half inch thickness of lead having the same cross sectional shape and area as said scintillation detector, said shielding placed immediately adjacent a second end of said crystal;
   a gamma ray counter for counting gamma rays detected by said detector and storing count rate signals thereof;
   a processor for processing said count rate signals according to a predetermined relationship to derive a measurement of the percentage of gas by volume in the well fluid in the vicinity of said source;
   a housing supporting said source, said detector, and said gamma ray counting means internally of said metal casing in which said produced well fluid is flowing, said housing being moveable through the cased well borehole supported on a wireline cable;
   a telemetry system in said housing for transmitting said count rate signals on said wireline cable as to the earth's surface; and
   means for processing said telemetry signals received at the surface of the earth according to a predetermined relationship as a function of well casing diameter to derive a measurement signal indicative of gas holdup as a function of borehole depth; said predetermined relationship being a function of well casing diameter comprising one of a plurality of calibrated relationships from a plurality of various diameter well casings.

20. A system for determining the percentage of gas by volume in mixed phase well fluids produced in a cased well borehole and flowing upwardly through a metal casing comprising:
   a source of relatively low energy gamma rays selected from the group consisting of cobalt 57 and cadmium 109, the energy of said gamma rays being selected such that there is a small probability that a gamma ray from said source could penetrate the metal casing and be scattered back through the metal casing by material outside the casing;
   a scintillation detector of gamma radiation and cooperative shielding means for preventing direct irradiation of said detector by said source while allowing the placement of said detector in close proximity to said source to allow detection of gamma rays emitted by said source and scattered by materials inside said metal casing, said detector comprising an approximately cylindrical sodium iodide crystal coupled to a photomultiplier tube;
   a closed housing member in which said source and said detector are housed and are positioned inside the well casing in which said produced well fluids are flowing to the earth's surface;
   means for counting gamma rays detected by said detector and storing count rate signals thereof; and
   means for processing said count rate signals according to a predetermined relationship to derive a measurement of the percentage of gas by volume in the well fluid in the vicinity of said source.

21. A method of measuring the percentage of gas by volume in mixed phase well fluids flowing in a deviated well, comprising the steps of:
   positioning a source of low energy gamma rays in a cased well having flowing fluids wherein the energy level is selected so that the gamma ray irradiation from the source is not likely to penetrate the casing of the well and be scattered back into the casing from formation materials outside the casing;
   detecting the gamma rays scattered by materials in the casing in near proximity to the source by means of a detector;
   shielding the detector from direct irradiation by the source;
   positioning the source and the shielded detector in a closed housing, and pulling the housing along said deviated well exposed to stratified and separated flow permitting as to rise to one side of the cased well, and detecting gamma ray counts along the cased well;
   establishing different predetermined relationships for different diameters of well casing; and
   converting the detected gamma ray counts in reference to said established predetermined relationships into a measurement of the percentage of gas by volume in said well fluids flowing in said cased well.

* * * * *